United States Patent [19]

Itoh

[11] Patent Number: 4,707,082
[45] Date of Patent: Nov. 17, 1987

[54] VARIABLE MAGNIFICATION COPYING LENS SYSTEM

[75] Inventor: Takayuki Itoh, Tokyo, Japan

[73] Assignee: Asahi Kogaku Kogyo Kabushiki Kaisha, Tokyo, Japan

[21] Appl. No.: 804,970

[22] Filed: Dec. 5, 1985

[30] Foreign Application Priority Data

Dec. 13, 1984 [JP] Japan .................................. 59-264109

[51] Int. Cl.$^4$ ........................ G02B 15/14; G02B 9/64
[52] U.S. Cl. .................................... 350/425; 350/463
[58] Field of Search ........................ 350/425, 463, 423

[56] References Cited

U.S. PATENT DOCUMENTS 4,560,242 12/1985 Tokuhara et al. .................. 350/425
4,586,814 5/1986 Tokuhara et al. ............... 350/425 X Primary Examiner—Bruce Y. Arnold
Assistant Examiner—Scott J. Sugarman
Attorney, Agent, or Firm—Sughrue, Mion, Zinn, Macpeak & Seas

[57] ABSTRACT

A variable magnification copying lens system with the arrangement composed, in order from the object side, of a first lens unit (A) having a negative focal length, a lens group (B) having a positive focal length, and a second lens unit (C) having a negative focal length. The system being capable of maintaining a constant distance between the object surface and the image surface not only by changing the distance between the first lens unit (A) and the lens group (B) and that between the lens group (B) and the second lens unit (C) but also by moving the overall lens system. The first and second lens units (A) and (C) have the primary function of maintaining a constant distance between the object surface and the image surface by a substantially symmetrical movement with respect to the lens group (B). Each of the first and second lens units being simply made of a single negative lens. The lens group (B) has the primary function of zooming and a five-unit and five-element configuration composed of a center biconvex lens, a negative meniscus lens that is positioned on both sides of the biconvex lens and the concave surface of which is directed toward the center, and a positive meniscus lens that is positioned on the outer side of the negative meniscus lens and the concave surface of which is directed toward the center.

9 Claims, 16 Drawing Figures

VARIABLE MAGNIFICATION COPYING LENS SYSTEM

BACKGROUND OF THE INVENTION

The present invention relates to a variable magnification copying lens system that is useful in the optics of a copying machine and which is capable of realizing both size enlargement and reduction while maintaining a constant distance between the object surface and the image surface.

The conventional variable magnification lens systems capable of size enlargement and reduction while maintaining a constant distance between the object and image are classified into the following three types:

(i) a system that is simply composed of two negative and positive, or positive and negative, lens groups, but which is incapable of attaining a zoom ratio of 2 (see, for example, Japanese Patent Publication No. 13887/1983 and Unexamined Published Japanese Patent Application No. 68810/1982);

(ii) a system that is composed of three negative, positive and negative lens groups, or four negative, positive, positive and negative lens groups, but which is incapable of attaining a zoom ratio much greater than 2 (see, for example, Unexamined Published Japanese Patent Application Nos. 159614/1981, 67909/1982 and 67512/1984); and (iii) a system that is composed of three negative, positive and negative lens groups, or four negative, positive, positive and negative lens groups, and which is capable of attaining a zoom ratio as great as 4 or 9, but which is useful in a variable magnification lens system for plate-making, rather than copying, purposes because of the large object-to-image distance (small view angle), the large size of the overall lens system and the great number of lens elements incorporated (see, for example, Unexamined Published Japanese Patent Application Nos. 1242/1974, 60655/1978 and 11260/1980).

However, these conventional lens systems are either low in zoom ratios (a little more than 2) or bulky and are incapable of meeting the demands of recent versions for relatively high zoom ratios and compact arrangements.

The conventional systems consisting of three or four lens groups use a master lens group (reference lens group) with six or more lens elements arranged in a substantially symmetrical fashion, and in some of the systems, the aerial distance in the center is fixed, but in most systems, the central aerial distance is variable and requires complicated lens arrangements and zooming methods.

SUMMARY OF THE INVENTION

The primary object, therefore, of the present invention is to provide a variable magnification copying lens system that consists of three negative, positive and negative lens groups and which attains a zoom ratio greater than 3. The lens system of the present invention requires a small object-to-image distance (wide view angle), is compact in size, uses a reduced number of lens elements and can be manufactured at low cost.

The variable magnification copying lens system of the present invention basically has the arrangement, in order from the object side, of a first lens unit (A) having a negative focal length, a lens group (B) having a positive focal length, and a second lens unit (C) having a negative focal length, and is capable of maintaining a constant distance between the object surface and the image surface not only by changing the distance between the first lens unit (A) and the lens group (B) and that between the lens group (B) and the second lens unit (C) but also by moving the overall lens system. This lens system is characterized in that said first and second lens units (A) and (C) have the primary function of maintaining a constant distance between the object surface and the image surface by a substantially symmetrical movement with respect to the lens group (B), each of said first and second lens units being simply made of a single negative lens, said lens group (B) having the primary function of zooming and having a five-unit and five-element configuration composed of a center biconvex lens, a negative meniscus lens that is positioned on both sides of said biconvex lens and the concave surface of which is directed toward the center, and a positive meniscus lens that is positioned on the outer side of said negative meniscus lens and the concave surface of which is directed toward the center.

In a preferred embodiment of the variable magnification copying lens system of the present invention, either the first lens unit (A) or the second lens unit (C) satisfies the following conditions:

$$-0.8 < F/F_{I(III)} < -0.35; \quad (1)$$

$$40 < \nu_{I(III)}; \text{ and} \quad (2)$$

$$-1.5 < F/f_{1(14)} < -0.8 \quad (3)$$

wherein the focal length of the overall system for unity magnification;

$F_{I(III)}$: the focal length of the first or second lens unit;

$\nu_{I(III)}$: the Abbe number of the negative lens in the first or second lens unit; and $f_{1(14)}$: the focal length of the first or 14th surface, and the lens group (B) satisfies the following conditions:

$$2.5 < F/f_{3(12)} < 4.0; \quad (4)$$

$$-4.0 < F/f_{6(9)} < -2.5; \text{ and} \quad (5)$$

$$1.2 < F/f_{7(8)} < 2.5 \quad (6)$$

wherein $f_{3(12)}$: the focal length of the third or 12th surface;

$f_{6(9)}$: the focal length of the sixth or ninth surface; and $f_{7(8)}$: the focal length of the seventh or eighth surface.

This embodiment is advantageous for the purposes of providing a compact system configuration and compensation of aberrations.

From the viewpoint of manufacturing costs, the system of the present invention features a completely symmetrical arrangement of lens elements.

In consideration of the space within the copying machine, another preferred embodiment of the lens system of the present invention is such that the following condition is satisfied at the enlargement end:

$$0.8 < \Delta D_{I\,II}/\Delta D_{II\,III} \leq 1.0 \quad (7)$$

wherein $\Delta D_{I\,II}$ is the amount of change in the distance between the first lens unit (A) and the lens group (B), and $\Delta D_{II\,III}$ is the amount of change in the distance between the lens group (B) and the second lens unit (C), each amount of change being measured with respect to the lens group (B).

DETAILED DESCRIPTION OF THE PREFERRED EMBODIMENTS

Figure 1:
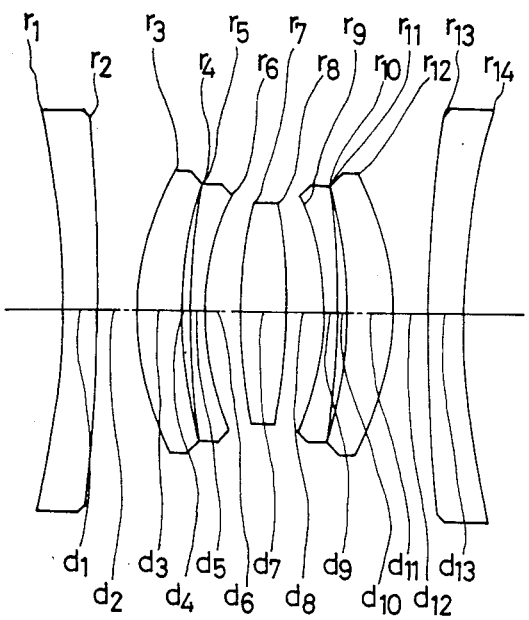
FIGS. 1, 3, 5, and 7 show schematically the configurations of the lens systems for unity magnification in accordance with Examples 1, 2, 3 and 4, respectively.
Figure 2A:
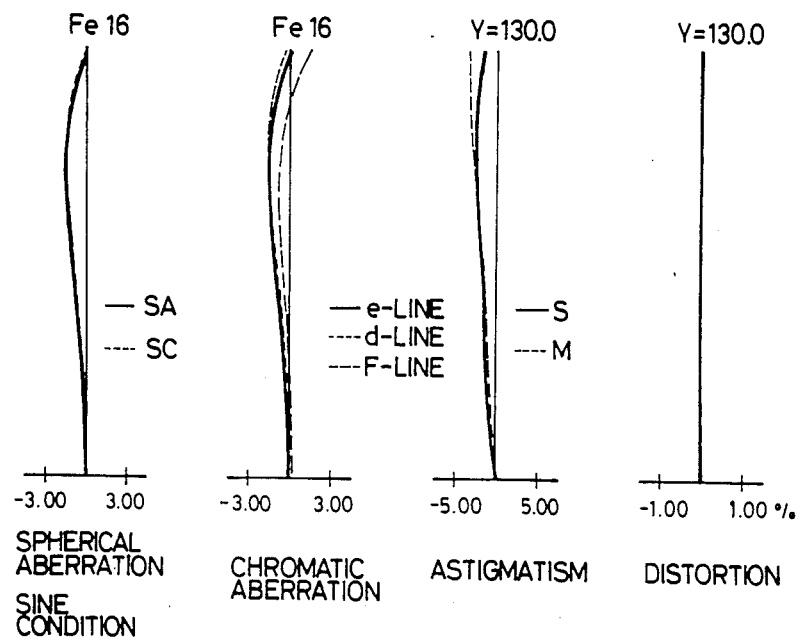
FIGS. 2, 4, 6 and 8 are aberration diagrams for the lens systems of Examples 1, 2, 3 and 4, respectively, (a) assuming unity magnification, (b) referring to the reduction end, and (c) referring to the enlargement end.
Figure 2B:
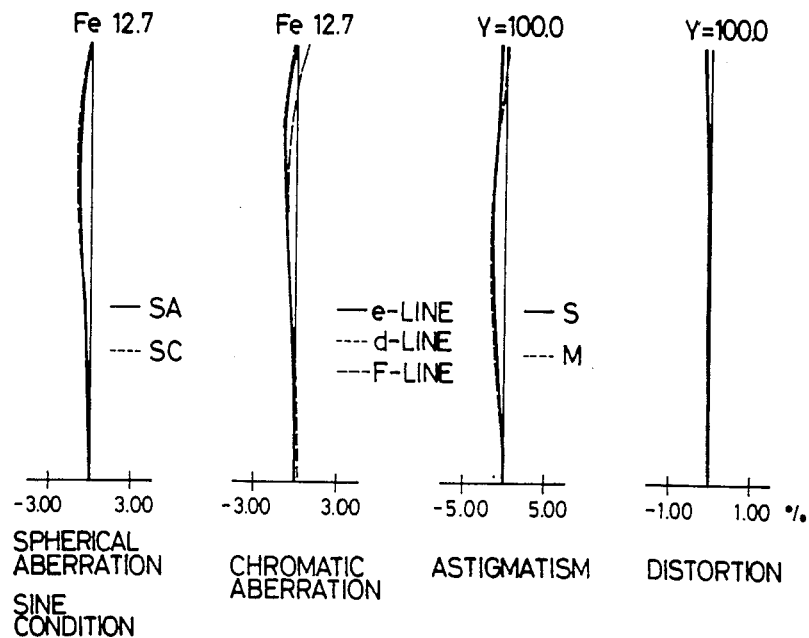
Figure 2C:
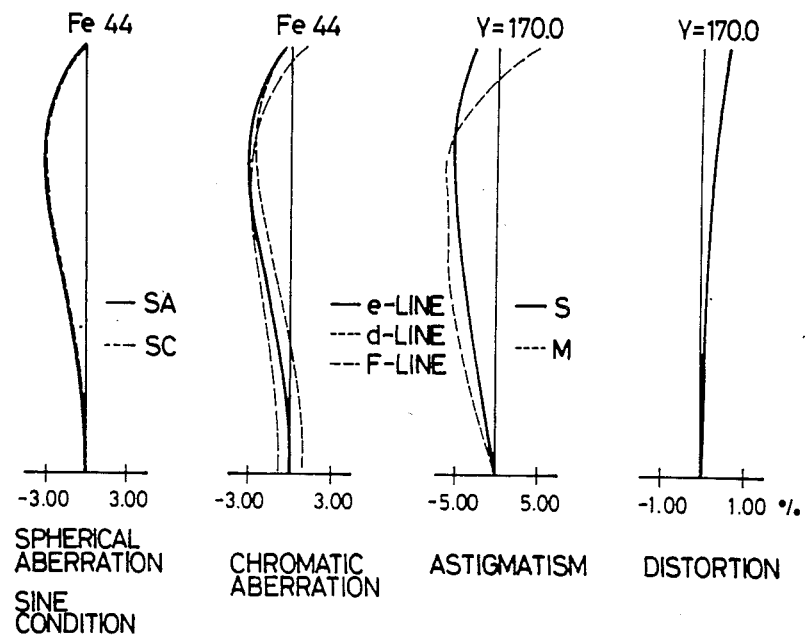
Figure 3:
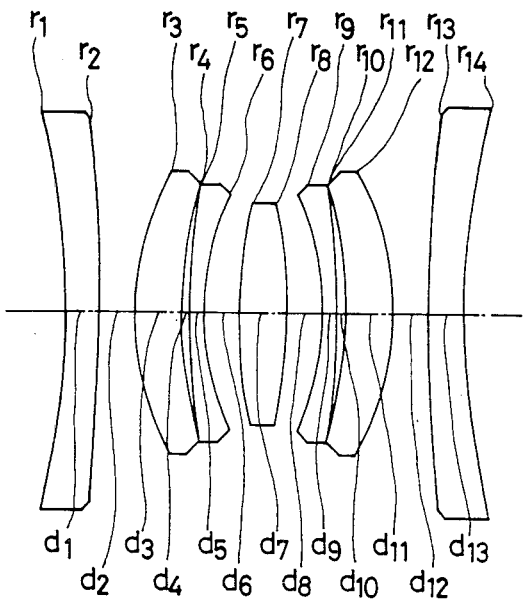
Figure 4A:
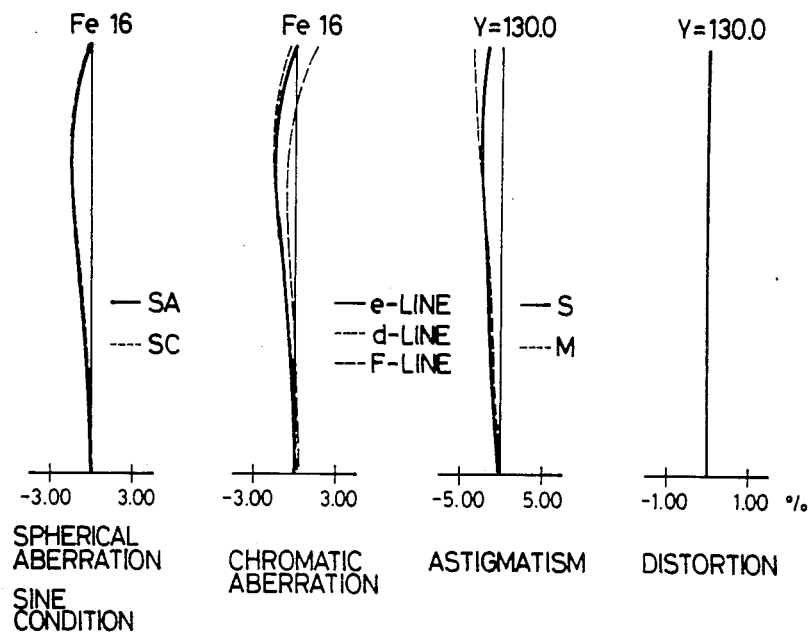
Figure 4B:
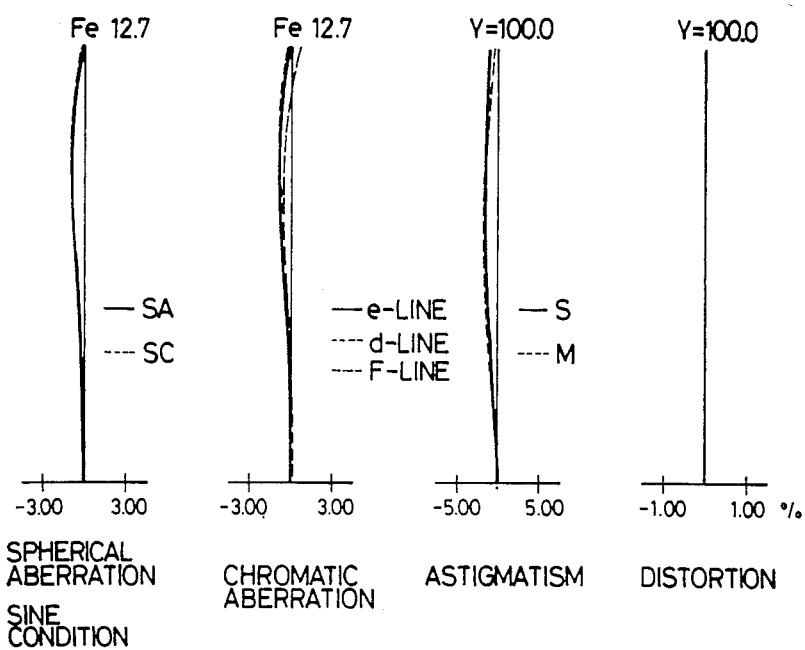
Figure 4C:
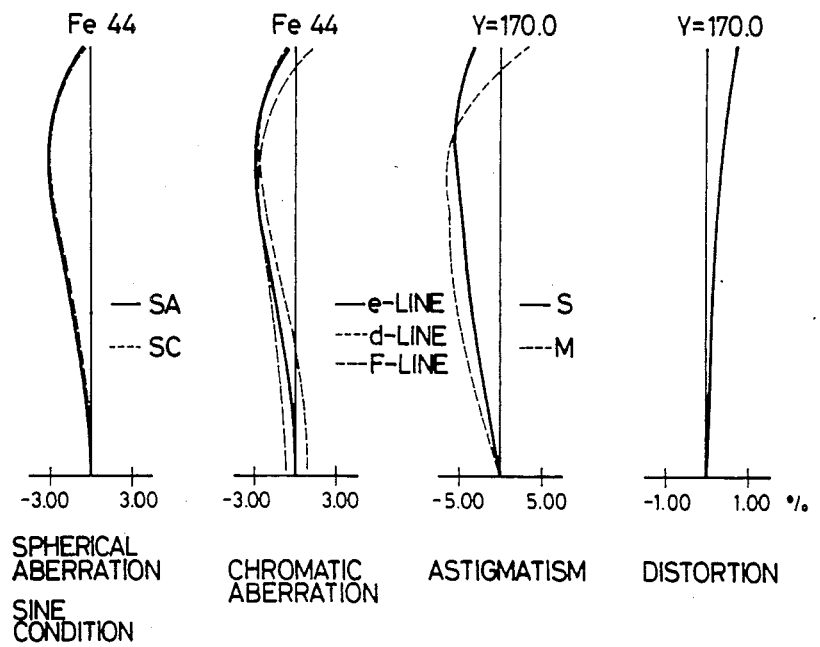
Figure 5:
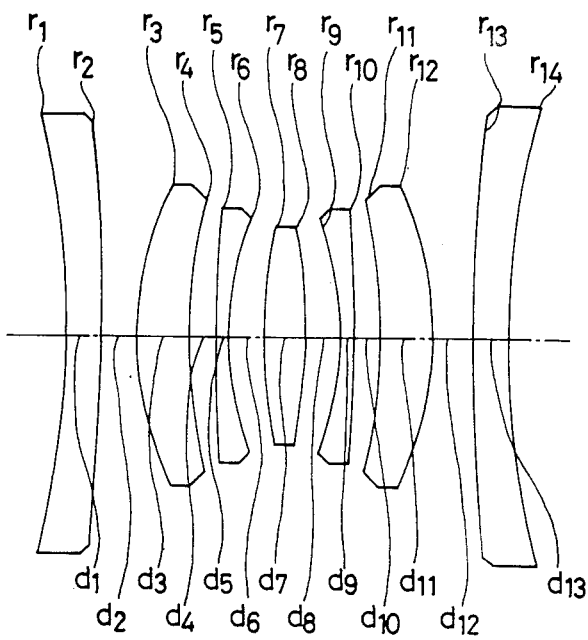
Figure 6A:
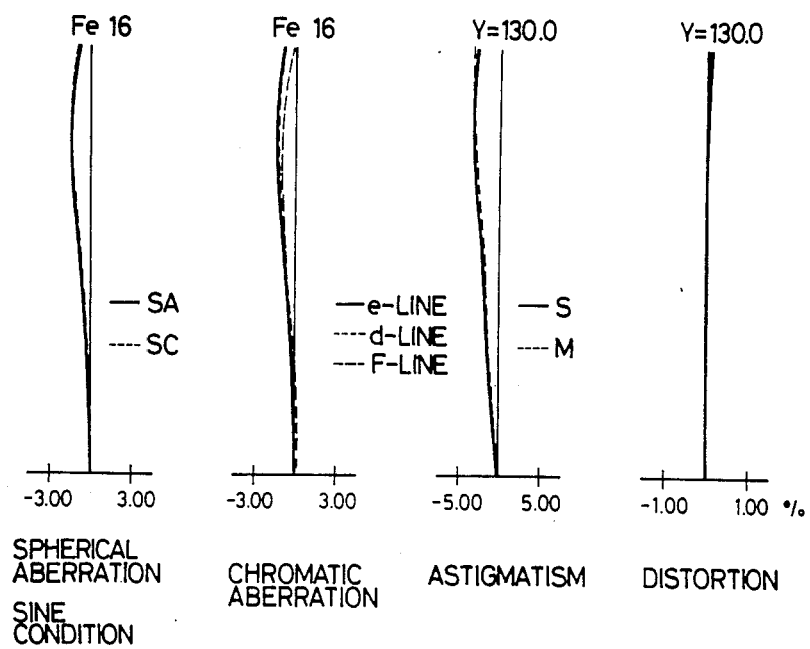
Figure 6B:
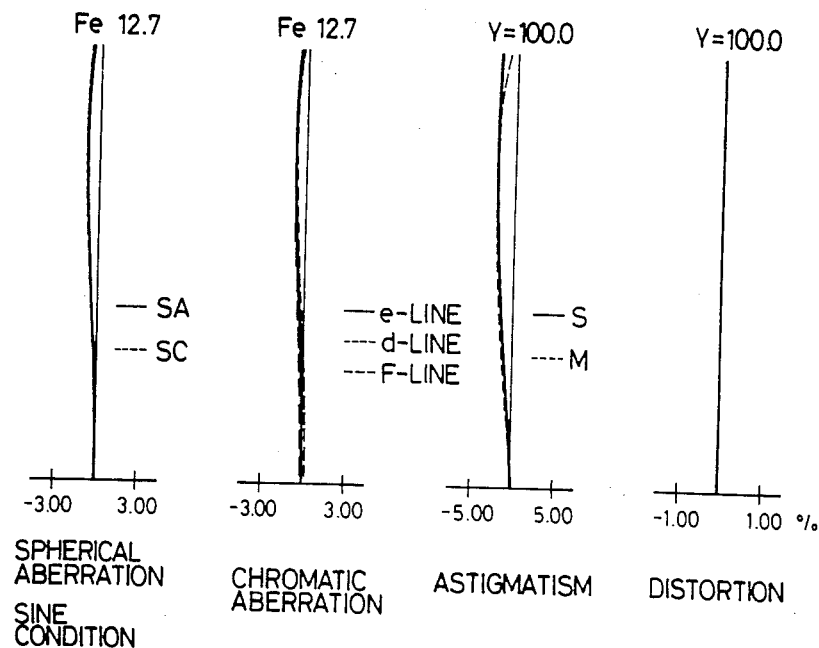
Figure 6C:
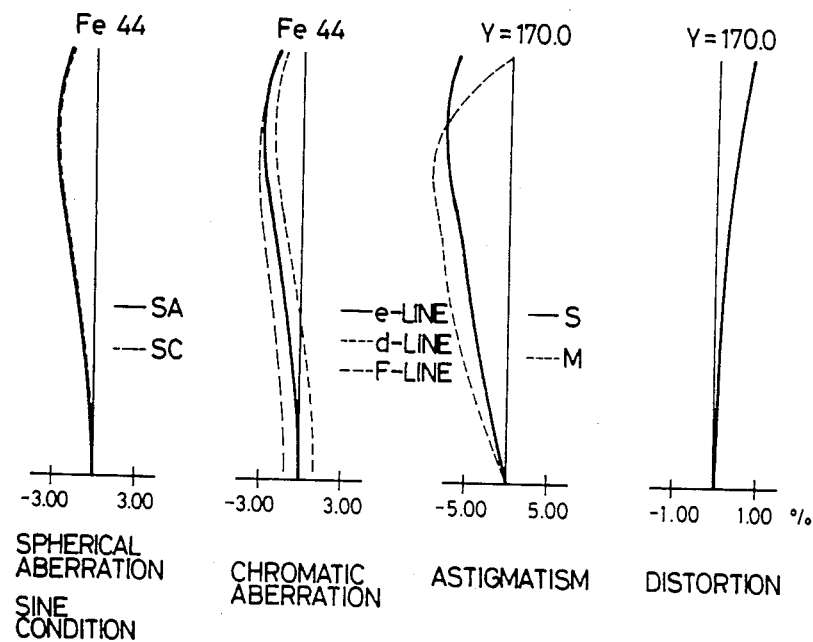
Figure 7:
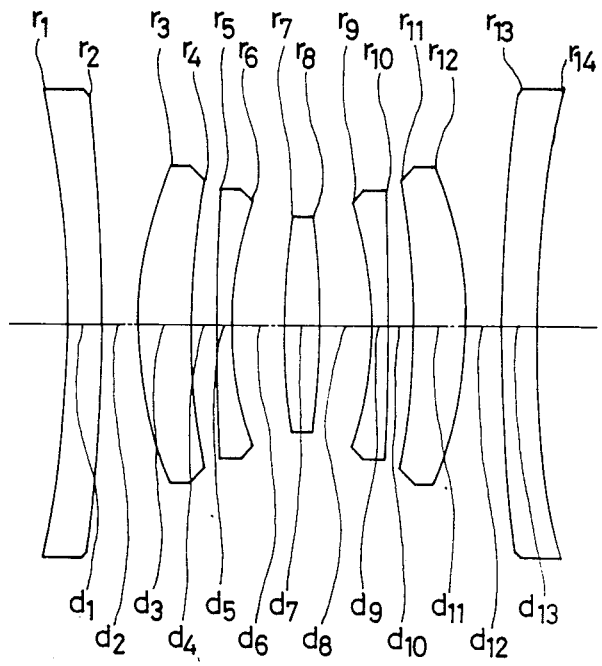
Figure 8A:
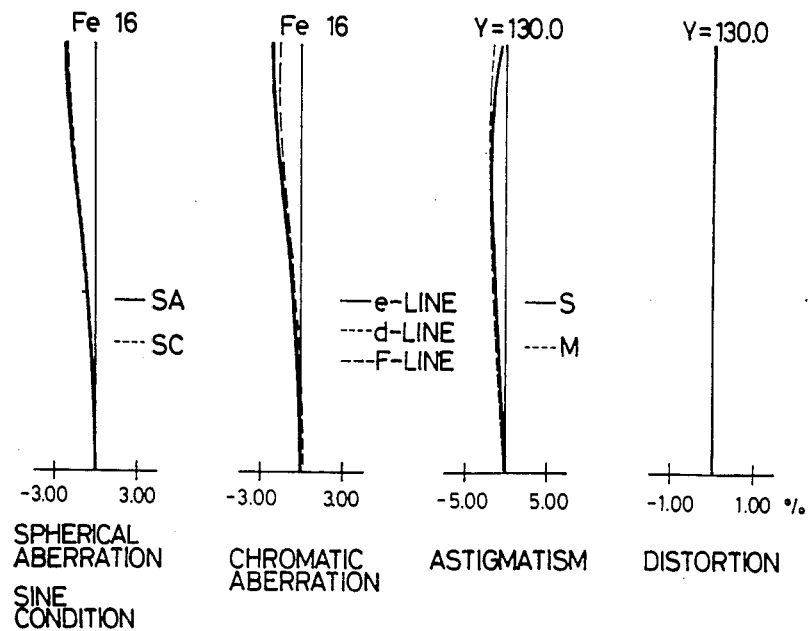
Figure 8B:
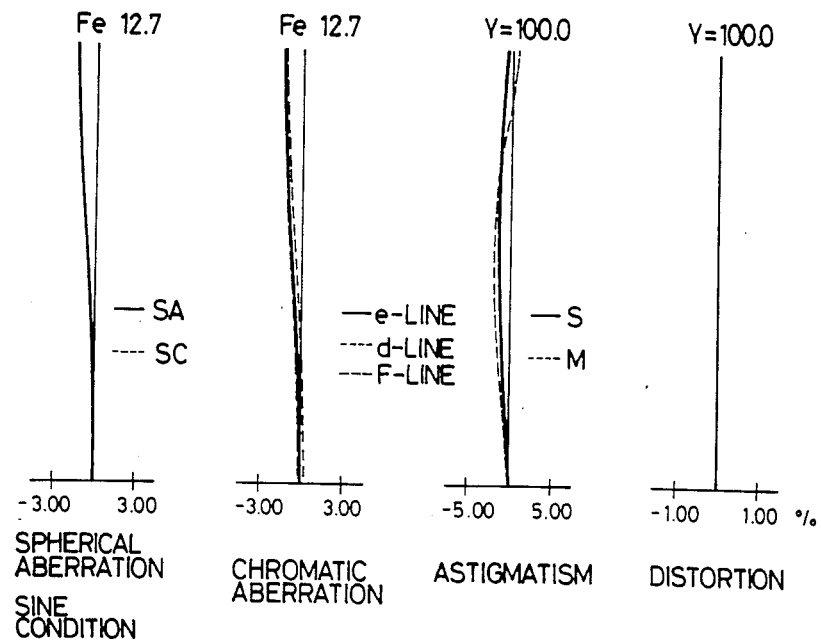
Figure 8C:
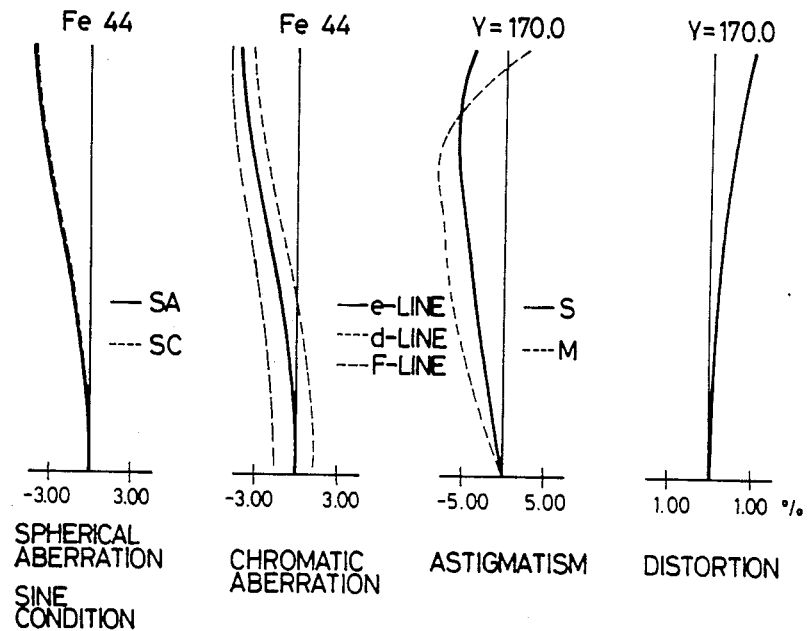

The conditions (1), (2) and (3) concern the first lens unit (A) or the second lens unit (C).

The condition (1) concerns the power of either lens unit. If the upper limit for this condition is exceeded, advantages result for the purpose of compensating aberrations, but because of the small change that can be realized in the focal length of the overall system in comparison with the change in the distance between the first lens unit (A) and the lens group (B) and that between the lens group (B) and the second lens unit (C), a zoom ratio of 2 upward can only be attained by increasing the distance between the first lens unit (A) and the lens group (B) and that between the lens group (B) and the second lens unit (C), but then, this inevitably requires the use of extremely large-diameter lens elements in the first and second lens units. If the lower limit for the condition (1) is not reached, the increased power presents advantages for the purpose of reducing the size of the overall system, but on the other hand, a single lens element is insufficient to effectively compensate for variations in such aberrations as chromatic aberration, spherical aberration and curvature of field in a zooming mode.

The condition (2) must be met in order to make up each of the first and second lens units (A) and (C) by a single negative lens, and if this condition is not met, variations in the chromatic aberration cannot be effectively compensated in a zooming mode.

The condition (3) concerns the power of the surface on the object side of the first lens unit ($r_1$) or the surface on the image side of the second lens unit ($r_{14}$). By making these surfaces divergent, a curvature of field can be overcompensated and a positive distortion can be obtained, with the result that a balance is achieved between the first or second lens unit and the lens group (B) so as to provide a compact and high-performance lens system. If the upper limit for the condition (2) is exceeded, the power of each of the divergent surfaces, and hence, the power of each lens unit is so much reduced that a large lens system is necessary to achieve a balance with the lens group (B). If the lower limit for condition (3) is not reached, the power of each of the divergent surfaces is too great to provide a balance with the lens group (B). Taking an astigmatism as an example, it is undercompensated at an intermediate view angle whereas it is overcompensated on the periphery, thereby making it impossible to obtain a balance between the intermediate and peripheral portions.

The conditions (4), (5) and (6) concern the lens group (B) and must be met for the purpose of achieving a balance in the compensation of aberrations developing in the divergent surfaces of the first and second lens units (A) and (C).

The condition (4) specifies the powers of the two outermost surfaces ($r_3$ and $r_{12}$) of the lens group (B). These surfaces are convergent, and if the lower limit for the condition (4) is not reached, they have too small powers to achieve a balance with the divergent surfaces of the first and second lens units (A) and (C). If the upper limit for the condition (4) is exceeded, the powers of the convergent surfaces become so great that considerable difficulty is involved in compensating for spherical and coma aberrations.

The condition (5) concerns the powers of two divergent surfaces ($r_6$ and $r_9$) within the lens group (B). Although the lens group (B) is positive, some compensation for aberrations within this lens group is necessary in order to avoid excessive variations of aberrations that may occur in a zooming mode. If the lower limit for the condition (5) is not reached, the powers of the divergent surfaces ($r_6$ and $r_9$) become so great as to cause overcompensation of spherical and coma aberrations. If the upper limit for the condition (5) is exceeded, spherical and coma aberrations that will develop in the outermost surfaces of the lens group (B) cannot be properly compensated.

The condition (6) concerns the powers of the two surfaces ($r_7$ and $r_8$) of the positive lens positioned in the center of the lens group (B). Like the surfaces $r_3$ and $r_{12}$ specified by the condition (4), the surfaces $r_7$ and $r_8$ are convergent. Both conditions (4) and (6) have controlling effects on spherical and coma aberrations, but the effect of the coma abberation on the spherical aberration is greater in condition (6) than in condition (4).

The lens system of the present invention permits the use of a pair of lens elements of the identical shape by arranging them symmetrically with respect to the center line, and therefore, the overall system can be manufactured efficiently and at low cost.

The condition (7), that is preferably satisfied by the lens system of the present invention at the enlargement end, states that the amount of movement of the first lens unit (A) with respect to the lens group (B) should be made smaller than that of the second lens unit (C). If this condition is met, the distance between the object and the lens system is sufficiently increased to ensure the mirror installation space for copying machines which are usually designed to accommodate a mirror on the object side of the lens system.

As will be apparent from the foregoing description, the present invention provides a variable magnification copying lens system that uses a reduced number of lens elements, requires a simple zooming method, is compact in size and experiences minimum degrees of aberrations.

EXAMPLES

Examples 1 to 4 of the present invention are shown below, wherein r=the radius of curvature of a specific lens surface, d=the lens thickness or distance between lens surfaces, N=the refractive index of a specific lens at d-line, $\nu$=the Abbe number of a specific lens, F=the focal length of the overall system for unity magnification, Fe=the effective F number for unity magnification, $f_B$=back focus, L=the distance between the object and the image surface, and m=magnification range.

| Example 1 | | | |
|---|---|---|---|
| F No. 1:8  Fe = 16  F = 135.4  $f_B$ = 195.3 — 339.5 | | | |
| L = 550.9  m = −0.64 — −2 | | | |
| Surface No. | r | d | N | $\nu$ |

-continued

| Surface No. | r | d | N | ν |
|---|---|---|---|---|
| 1 | −64.416 | 3.000 | 1.62299 | 58.2 |
| 2 | −138.849 | 3.333 − 6.301(−0.64X) − 10.600(−2X) | | |
| 3 | 22.710 | 3.861 | 1.62299 | 58.2 |
| 4 | 34.290 | 0.727 | | |
| 5 | 71.747 | 1.200 | 1.60342 | 38.0 |
| 6 | 22.266 | 3.009 | | |
| 7 | 41.545 | 3.991 | 1.67003 | 47.3 |
| 8 | −41.545 | 3.009 | | |
| 9 | −22.266 | 1.200 | 1.60342 | 38.0 |
| 10 | −71.747 | 0.727 | | |
| 11 | −34.290 | 3.861 | 1.62299 | 58.2 |
| 12 | −22.710 | 3.000 − 6.297(−0.64X) − 11.074(−2X) | | |
| 13 | 138.849 | 3.000 | 1.62299 | 58.2 |
| 14 | 64.416 | 258.134 | | |

$F/F_{I(III)} = -0.694$
$F/f_{1(14)} = -1.309$
$F/f_{6(9)} = -3.67$
$\Delta D_{I\,II}/\Delta D_{II\,III} = 0.90$
$\nu_{I(III)} = 58.2$
$F/f_{3(12)} = 3.71$
$F/f_{7(8)} = 2.18$ Example 2
F No. 1:8  Fe = 16  F = 135.4  $f_B$ = 195.2 − 339.6
L = 551.0  m = −0.64 − −2

| Surface No. | r | d | N | ν |
|---|---|---|---|---|
| 1 | −64.331 | 3.000 | 1.62041 | 60.3 |
| 2 | −142.200 | 3.000 − 5.887(−0.64X) − 10.069(−2X) | | |
| 3 | 22.798 | 3.973 | 1.62041 | 60.3 |
| 4 | 34.206 | 0.709 | | |
| 5 | 69.778 | 1.200 | 1.60342 | 38.0 |
| 6 | 22.297 | 3.010 | | |
| 7 | 41.497 | 3.988 | 1.67003 | 47.3 |
| 8 | −41.497 | 3.010 | | |
| 9 | −22.297 | 1.200 | 1.60342 | 38.0 |
| 10 | −69.778 | 0.709 | | |
| 11 | −34.206 | 3.973 | 1.62041 | 60.3 |
| 12 | −22.798 | 3.000 − 6.208(−0.64X) − 10.853(−2X) | | |
| 13 | 142.200 | 3.000 | 1.62041 | 60.3 |
| 14 | 64.331 | 257.960 | | |

$F/F_{I(III)} = -0.707$
$F/f_{1(14)} = -1.306$
$F/f_{6(9)} = -3.66$
$\Delta D_{I\,II}/\Delta D_{II\,III} = 0.90$
$\nu_{I(III)} = 60.3$
$F/f_{3(12)} = 3.68$
$F/f_{7(8)} = 2.19$ Example 3
F No. 1:8  Fe = 16  F = 135.3  $f_B$ = 191.5 − 334.0
L = 548.6  m = −0.64 − −2

| Surface No. | r | d | N | ν |
|---|---|---|---|---|
| 1 | −70.160 | 3.000 | 1.51633 | 64.1 |
| 2 | −168.593 | 3.000 − 6.861(−0.64X) − 12.469(−2X) | | |
| 3 | 26.790 | 4.420 | 1.57135 | 53.0 |
| 4 | 43.621 | 2.240 | | |
| 5 | 113.000 | 1.200 | 1.60342 | 38.0 |
| 6 | 26.470 | 2.980 | | |
| 7 | 45.985 | 3.520 | 1.72000 | 50.2 |
| 8 | −45.985 | 2.980 | | |
| 9 | −26.470 | 1.200 | 1.60342 | 38.0 |
| 10 | −113.000 | 2.240 | | |
| 11 | −43.621 | 4.420 | 1.57135 | 53.0 |
| 12 | −26.790 | 3.333 − 7.623(−0.64X) − 13.853(−2X) | | |
| 13 | 168.593 | 3.000 | 1.51633 | 64.1 |
| 14 | 70.160 | 255.226 | | |

$F/F_{I(III)} = -0.577$
$F/f_{1(14)} = -0.996$
$F/f_{6(9)} = -3.08$
$\Delta D_{I\,II}/\Delta D_{II\,III} = 0.90$
$\nu_{I(III)} = 64.1$
$F/f_{3(12)} = 2.89$
$F/f_{7(8)} = 2.12$ Example 4
F No. 1:8  Fe = 16  F = 136.0  $f_B$ = 189.0 − 327.7
L = 552.8  m = −0.64 − −2

| Surface No. | r | d | N | ν |
|---|---|---|---|---|
| 1 | −87.366 | 3.000 | 1.70154 | 41.2 |
| 2 | −138.841 | 3.000 − 9.442(−0.64X) − 18.894(−2X) | | |
| 3 | 31.604 | 4.441 | 1.69680 | 55.5 |
| 4 | 63.302 | 2.151 | | |
| 5 | 257.538 | 1.334 | 1.59551 | 39.2 |
| 6 | 30.099 | 4.402 | | |
| 7 | 64.386 | 3.024 | 1.74400 | 44.7 |
| 8 | −64.386 | 4.402 | | |
| 9 | −30.099 | 1.334 | 1.59551 | 39.2 |
| 10 | −257.538 | 2.151 | | |
| 11 | −63.302 | 4.441 | 1.69680 | 55.5 |
| 12 | −31.604 | 3.000 − 10.157(−0.64X) − 20.659(−2X) | | |
| 13 | 138.841 | 3.000 | 1.70154 | 41.2 |
| 14 | 87.366 | 255.904 | | |

$F/F_{I(III)} = -0.397$
$F/f_{1(14)} = -1.092$
$F/f_{6(9)} = -2.69$
$\Delta D_{I\,II}/\Delta D_{II\,III} = 0.90$
$\nu_{I(III)} = 41.2$
$F/f_{3(12)} = 3.00$
$F/f_{7(8)} = 1.57$

I claim:

1. In a variable magnification copying lens system with the arrangement, in order from the object side, of a first lens unit (A) having a negative focal length, a lens group (B) having a positive focal length, and a second lens unit (C) having a negative focal length, said system being capable of maintaining a constant distance between the object surface and the image surface not only by changing the distance between the first lens unit (A) and the lens group (B) and that between the lens group (B) and the second lens unit (C), but also by moving the overall lens system, the improvement wherein said first and second lens units (A) and (C) have the primary function of maintaining a constant distance between the object surface and the image surface by a substantially symmetrical movement with respect to the lens group (B), each of said first and second lens units being simply made of a single negative lens, said lens group (B) having the primary function of zooming and having a five-unit and five-element configuration composed of a center, single-element biconvex lens, a negative meniscus lens that is positioned on both sides of said biconvex lens and the concave surface of which is directed toward the center, and a positive meniscus lens that is positioned on the outer side of said negative meniscus lens and the concave surface of which is directed toward the center, said lens elements of said lens group (B) having fixed positions relative to one another.

2. A variable magnification copying lens system according to claim 1 wherein either the first lens unit (A) or the second lens unit (C) satisfies the following conditions:

$$-0.8 < F/F_{I(III)} < -0.35; \quad (1)$$

$$40 < \nu_{I(III)}; \text{ and} \quad (2)$$

$$-1.5 < F/f_{1(14)} < -0.8 \quad (3)$$

wherein
F: the focal length of the overall system for unity magnification;
$F_{I(III)}$: the focal length of the first or second lens unit;
$\nu_{I(III)}$: the Abbe number of the negative lens in the first or second lens unit; and
$f_{1(14)}$: the focal length of the first or 14th surface.

3. A variable magnification copying lens system according to claim 1 wherein the lens group (B) satisfies the following conditions:

$$2.5 < F/f_{3(12)} < 4.0; \quad (4)$$

$$-4.0 < F/f_{6(9)} < -2.5; \text{ and} \quad (5)$$

$$1.2 < F/f_{7(8)} < 2.5 \quad (6)$$

wherein $f_{3(12)}$: the focal length of the third or 12th surface;
$f_{6(9)}$: the focal length of the sixth or ninth surface; and
$f_{7(8)}$: the focal length of the seventh or eighth surface.

4. A variable magnification copying lens system according to claim 1 wherein each of the lens elements is completely symmetric in shape with respect to the center line.

5. A variable magnification copying lens system according to claim 1 which satisfies the following conditions at the enlargement end:

$$0.8 < \Delta D_{I\,II}/\Delta D_{II\,III} \leq 1.0 \quad (7)$$

wherein $\Delta D_{I\,II}$ is the amount of change in the distance between the first lens unit (A) and the lens group (B), and $\Delta D_{II\,III}$ is the amount of change in the distance between the lens group (B) and the second lens unit (C), each amount of change being measured with respect to the lens group (B).

6. A variable magnification copying lens system according to claim 1, satisfying the following chart:

| F No. 1:8  Fe = 16  F = 135.4  $f_B$ = 195.3 − 339.5 | | | |
|---|---|---|---|
| L = 550.9  m = −0.64 − −2 | | | |
| Surface No. | r | d | N | $\nu$ |
|---|---|---|---|---|
| 1 | −64.416 | 3.000 | 1.62299 | 58.2 |
| 2 | −138.849 | 3.333 − 6.301(−0.64X) − 10.600(−2X) | | |
| 3 | 22.710 | 3.861 | 1.62299 | 58.2 |
| 4 | 34.290 | 0.727 | | |
| 5 | 71.747 | 1.200 | 1.60342 | 38.0 |
| 6 | 22.266 | 3.009 | | |
| 7 | 41.545 | 3.991 | 1.67003 | 47.3 |
| 8 | −41.545 | 3.009 | | |
| 9 | −22.266 | 1.200 | 1.60342 | 38.0 |
| 10 | −71.747 | 0.727 | | |
| 11 | −34.290 | 3.861 | 1.62299 | 58.2 |
| 12 | −22.710 | 3.000 − 6.297(−0.64X) − 11.074(−2X) | | |
| 13 | 138.849 | 3.000 | 1.62299 | 58.2 |
| 14 | 64.416 | 258.134 | | |
| $F/F_{I(III)}$ = −0.694 | | $\nu_{I(III)}$ = 58.2 | |
| $F/f_{1(14)}$ = −1.309 | | $F/f_{3(12)}$ = 3.71 | |
| $F/f_{6(9)}$ = −3.67 | | $F/f_{7(8)}$ = 2.18 | |
| $\Delta D_{I\,II}/\Delta D_{II\,III}$ = 0.90 | | | |

7. A variable magnification copying lens system according to claim 1, satisfying the following chart:

| F No. 1:8  Fe = 16  F = 135.4  $f_B$ = 195.2 − 339.6 | | | |
|---|---|---|---|
| L = 551.0  m = −0.64 − −2 | | | |
| Surface No. | r | d | N | $\nu$ |
|---|---|---|---|---|
| 1 | −64.331 | 3.000 | 1.62041 | 60.3 |
| 2 | −142.200 | 3.000 − 5.887(−0.64X) − 10.069(−2X) | | |
| 3 | 22.798 | 3.973 | 1.62041 | 60.3 |
| 4 | 34.206 | 0.709 | | |
| 5 | 69.778 | 1.200 | 1.60342 | 38.0 |
| 6 | 22.297 | 3.010 | | |
| 7 | 41.497 | 3.988 | 1.67003 | 47.3 |
| 8 | −41.497 | 3.010 | | |
| 9 | −22.297 | 1.200 | 1.60342 | 38.0 |
| 10 | −69.778 | 0.709 | | |
| 11 | −34.206 | 3.973 | 1.62041 | 60.3 |
| 12 | −22.798 | 3.000 − 6.208(−0.64X) − 10.853(−2X) | | |
| 13 | 142.200 | 3.000 | 1.62041 | 60.3 |
| 14 | 64.331 | 257.960 | | |
| $F/F_{I(III)}$ = −0.707 | | $\nu_{I(III)}$ = 60.3 | |
| $F/f_{1(14)}$ = −1.306 | | $F/f_{3(12)}$ = 3.68 | |
| $F/f_{6(9)}$ = −3.66 | | $F/f_{7(8)}$ = 2.19 | |
| $D_{I\,II}/D_{II\,III}$ = 0.90 | | | |

8. A variable magnification copying lens system according to claim 1, satisfying the following chart:

| F No. 1:8  Fe = 16  F = 135.3  $f_B$ = 191.5 − 334.0 | | | |
|---|---|---|---|
| L = 548.6  m = −0.64 − −2 | | | |
| Surface No. | r | d | N | $\nu$ |
|---|---|---|---|---|
| 1 | −70.160 | 3.000 | 1.51633 | 64.1 |
| 2 | −168.593 | 3.000 − 6.861(−0.64X) − 12.469(−2X) | | |
| 3 | 26.790 | 4.420 | 1.57135 | 53.0 |
| 4 | 43.621 | 2.240 | | |
| 5 | 113.000 | 1.200 | 1.60342 | 38.0 |
| 6 | 26.470 | 2.980 | | |
| 7 | 45.985 | 3.520 | 1.72000 | 50.2 |
| 8 | −45.985 | 2.980 | | |
| 9 | −26.470 | 1.200 | 1.60342 | 38.0 |
| 10 | −113.000 | 2.240 | | |
| 11 | −43.621 | 4.420 | 1.57135 | 53.0 |
| 12 | −26.790 | 3.333 − 7.623(−0.64X) − 13.853(−2X) | | |
| 13 | 168.593 | 3.000 | 1.51633 | 64.1 |
| 14 | 70.160 | 255.226 | | |
| $F/F_{I(III)}$ = −0.577 | | $\nu_{I(III)}$ = 64.1 | |
| $F/f_{1(14)}$ = −0.996 | | $F/f_{3(12)}$ = 2.89 | |
| $F/f_{6(9)}$ = −3.08 | | $F/f_{7(8)}$ = 2.12 | |
| $\Delta D_{I\,II}/\Delta D_{II\,III}$ = 0.90 | | | |

9. A variable magnification copying lens system according to claim 1, satisfying the following chart:

| F No. 1:8  Fe = 16  F = 136.0  $f_B$ = 189.0 − 327.7 | | | |
|---|---|---|---|
| L = 552.8  m = −0.64 − −2 | | | |
| Surface No. | r | d | N | $\nu$ |
|---|---|---|---|---|
| 1 | −87.366 | 3.000 | 1.70154 | 41.2 |
| 2 | −138.841 | 3.000 − 9.442(−0.64X) − 18.894(−2X) | | |
| 3 | 31.604 | 4.441 | 1.69680 | 55.5 |
| 4 | 63.302 | 2.151 | | |
| 5 | 257.538 | 1.334 | 1.59551 | 39.2 |
| 6 | 30.099 | 4.402 | | |
| 7 | 64.386 | 3.024 | 1.74400 | 44.7 |
| 8 | −64.386 | 4.402 | | |
| 9 | −30.099 | 1.334 | 1.59551 | 39.2 |
| 10 | −257.538 | 2.151 | | |
| 11 | −63.302 | 4.441 | 1.69680 | 55.5 |
| 12 | −31.604 | 3.000 − 10.157(−0.64X) − 20.659(−2X) | | |
| 13 | 138.841 | 3.000 | 1.70154 | 41.2 |
| 14 | 87.366 | 255.904 | | |
| $F/F_{I(III)}$ = −0.397 | | $\nu_{I(III)}$ = 41.2 | |
| $F/f_{1(14)}$ = −1.092 | | $F/f_{3(12)}$ = 3.00 | |
| $F/f_{6(9)}$ = −2.69 | | $F/f_{7(8)}$ = 1.57 | |
| $\Delta D_{I\,II}/\Delta D_{II\,III}$ = 0.90 | | | |

* * * * *